Figure 1:
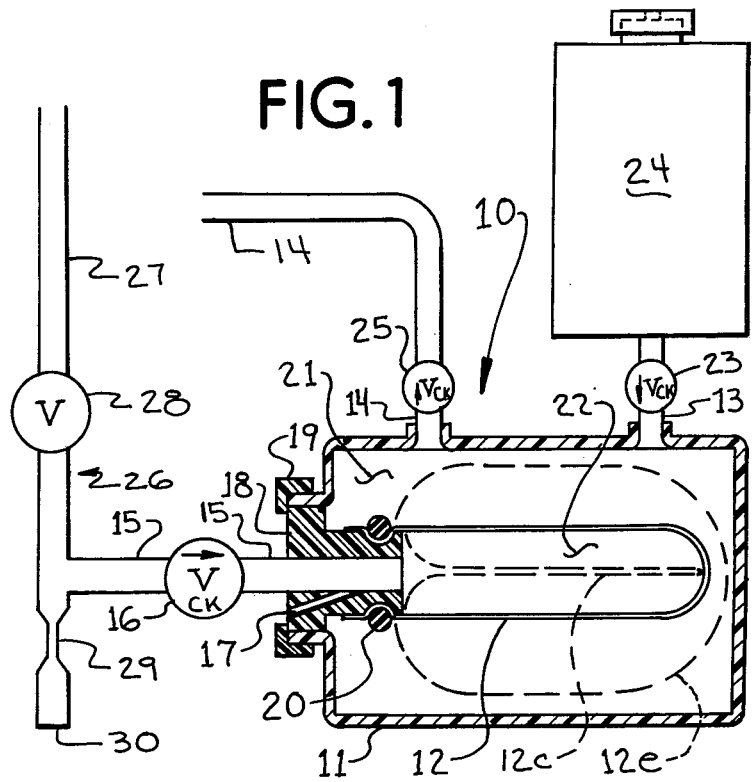

United States Patent [19]

Zygiel, deceased

[11] 4,120,424

[45] Oct. 17, 1978

[54] LIQUID DISPENSING PUMP

[75] Inventor: Alfred E. Zygiel, deceased, late of Dallas, Tex., by Mary E. Zygiel, heiress and devisee

[73] Assignee: The Cornelius Company, Golden Valley, Minn.

[21] Appl. No.: 748,242

[22] Filed: Dec. 2, 1976

[51] Int. Cl.² .................. B67D 5/56; G01F 11/08
[52] U.S. Cl. .................... 222/133; 222/207; 222/334
[58] Field of Search ............ 222/129.2, 133, 207, 222/209, 334, 373, 386.5

[56] References Cited

U.S. PATENT DOCUMENTS

| 2,585,172 | 2/1952 | Reynolds | 222/129.2 X |
| 2,665,825 | 1/1954 | Poitras et al. | 222/373 X |
| 3,288,332 | 11/1966 | Etter et al. | 222/181 X |
| 3,884,391 | 5/1975 | Pauliukonis | 222/334 X |

FOREIGN PATENT DOCUMENTS 604,479  7/1948  United Kingdom ............ 222/133

Primary Examiner—Robert B. Reeves
Assistant Examiner—Francis J. Bartuska
Attorney, Agent, or Firm—Henry C. Kovar

[57] ABSTRACT

A liquid dispensing pump is disclosed and is powerable by pressurized fluid intermittently applied to the pump, the pump has a pumping chamber, a pressurizing chamber, a movable member for transferring pressure to the pumping chamber, a fluid conduit to the pressurizing chamber for applying pressure to the pump, a valve in the conduit for preventing reverse flow of fluid and an open drain in fluid communication with the pressurizing chamber; any fluid used to power the pump is exhausted out of the drain both during and after pumping.

1 Claim, 2 Drawing Figures

LIQUID DISPENSING PUMP

BACKGROUND OF THE INVENTION

Field of the Invention

This invention pertains to a liquid dispensing pump which is operably powerable by a pressurized fluid.

Prior Art

Fluid powered pumps are well known in the prior art; the particular type of prior art pump of immediate interest is a liquid pump powered by intermittent application of pressurized fluid to one side of a movable member, examples of which members are diaphragms and pistons. Another side of the movable member applies the pressure to liquid to be pumped and as pressurized fluid is taken into an expanding pressurizing chamber, liquid is forced out of a pumping chamber which is decreasing in volume. When this type of pump completes a pumping cycle, the pressure on the power fluid is turned off and the fluid in the pressurizing chamber is discharged from the pump as the pump chamber refills for the next cycle.

The problem with this type of pump is how to dispose of the used fluid previously used to power the pump. The prior art typically discharges the use fluid back into the source from whence it came or alternatively uses a three-way valve and discharges the used fluid to a disposal apparatus. If the fluid is returned to its source, it may not be wanted and may be a nuisance; the three-way valve is a mechanical complication needed to make this type of pump system operative.

OBJECTS OF THE INVENTION

It is an object of the present invention to provide a fluid powered pump which does not return power fluid to the original source of the fluid.

It is another object of the present invention to provide a fluid powered pump which disposes of fluid used for power.

It is a further object of the present invention to provide a fluid powered pump having an extremely simple and economical structure for disposing of used power fluid.

SUMMARY OF THE INVENTION

In accordance with this invention a liquid pump is provided having a housing, pumping and pressurizing chambers in the housing, an inlet and outlet in the pumping chamber, a member in the housing for transferring pressure from the pressurizing chamber to the pumping chamber, a fluid conduit connected to the pressurizing chamber, a valve in the conduit for preventing reverse flow of fluid out of the conduit, and an open fluid drain in fluid communication with the pressurizing chamber; the drain is sized to have greater restriction to fluid flow than the conduit.

Many other advantages, features and additional objects of the present invention will become manifest to those versed in the art upon making reference to the detailed description and the accompanying sheet of drawing in which a preferred structural embodiment incorporating the principles of the present invention is shown by way of illustrative example.

ON THE DRAWING

Figure 2:
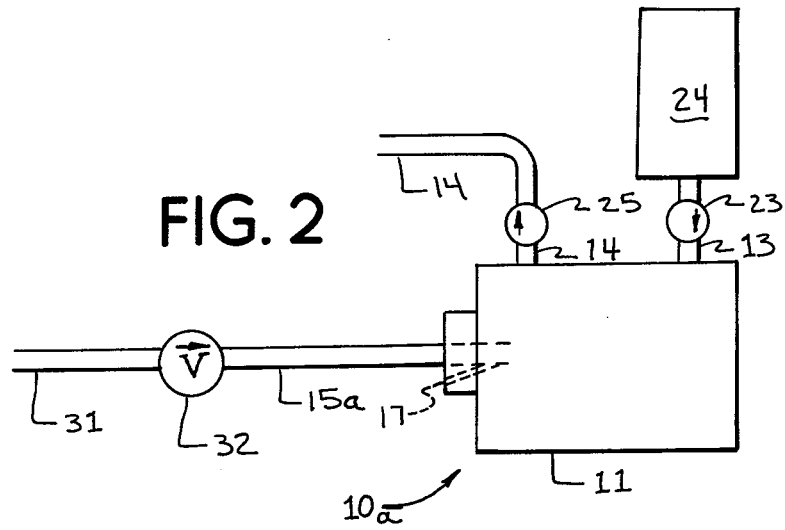

FIG. 1 is a schematic drawing of the preferred embodiment of a liquid pump provided in accordance with the principles of the present invention; and FIG. 2 is a schematic drawing of an alternative embodiment of the structure of FIG. 1.

The principles of the present invention are particularly useful when embodied in a liquid dispensing pump of the type illustrated in FIG. 1 and generally indicated by the numeral 10.

The pump 10 includes a housing 11, a diaphragm 12 inside of the housing 11, a liquid inlet 13, a liquid outlet 14, a power conduit 15 for pressurized power fluid, a valve 16 in the conduit 15 and an open drain 17 for power fluid.

The housing 11 is a rigid container of a suitable material, an example of which would be a structural plastic. At one end of the housing 11 there is a plug 18 which is removably fastened by a collar 19 to close the housing 11. The diaphragm 12 is fastened to and held on the plug 18 by an O-ring 20. The diaphragm 12, in the preferred embodiment, is an elastic, cylindrical expandable and collapsible member; a specific example of such a member is a finger cott. The diaphragm 12 physically divides the interior of the housing 11 into two separate chambers. On one side of the diaphragm 12 there is a liquid pumping chamber 21 and on another side of the diaphragm 12 there is a pressurizing chamber 22. The pumping chamber 21 has a liquid inlet 13 which has a liquid valve 23 which is operable for directing liquid flow into the pumping chamber 21 and is also operable to preclude liquid flow from the pumping chamber 21 back into the inlet 13. The inlet 13 may also be fluidly attached to a liquid reservoir 24 which is mounted atop or above the housing 11. The liquid reservoir 24 is vented to atmospheric air and drains solely by the force of gravity through the inlet valve 23, which may be a check valve, and into the pumping chamber 21 for filling and refilling the pumping chamber 21. The pumping chamber 21 also has a liquid outlet 14 which has a liquid valve 25 which is operative for directing liquid to flow from the pumping chamber 21 out of the liquid outlet line 14 and is also operative to prevent flow of liquid in the outlet line 14 back into the pumping chamber 21. The liquid outlet line valve 25 may also be a check valve. The outlet valve 25, if a check valve, preferably has a greater resistance to fluid flow than the liquid inlet valve 23 if a check valve so that when the pumping chamber 21 is gravity fed from the reservoir 24, the liquid will not drain through the outlet valve 25 until the pumping chamber is pressurized.

The power conduit 15 has one end fluidly connected to the pressurizing chamber 22 and a second end adapted to be connected to a source of fluid 26 under pressure. The pressurized fluid source 26 shown in FIG. 1 is a fluid line 27 under pressure and having a normally closed fluid valve 28 for controlling and permitting intermittent flow of pressurized fluid into a fluid restrictor 29 which, when the valve 28 is open and fluid is flowing, backs up the flowing fluid and the pressure into the conduit 15. The restrictor 29 then fluidly leads to an open fluid outlet 30 from whence the fluid is discharged from the fluid source 26. As is shown, the conduit 15 is fluidly connected to the pressurized fluid source 26 at a location intermediate the normally closed valve 28 and the restrictor 29. The conduit valve 16 is a check valve operable for permitting flow of fluid from the pressurized source 26 to flow from the source 26 and through the conduit 15 to the pressurizing chamber 22. The conduit valve 16 is also operative for precluding flow of fluid from the pressurizing chamber 22 back to the source 26 from whence the fluid came when the source valve 28 was open.

An important feature of the present invention is the drain 17 from the pressurizing chamber 22. The drain 17 is always open and is connected to be in fluid communication with the pressurizing chamber 22. The drain 17 is sized with respect to the conduit 15 to form a greater restriction to fluid flow than does the conduit 15. Specifically, the conduit 15 may have an internal bore with a diameter of 0.156 inch (4 mm) through which fluid under pressure may flow from the source 26 to the pressurizing chamber 22. A drain 17 sized with respect to the foregoing specific size of conduit 15 would have a bore of a much smaller size, specifically a bore of about 0.050 inch (1.3 mm) has been found to work well when the power fluid is water. It is necessary in the practice of this invention that the effective drain size form a greater restriction to fluid flow than does the conduit. The drain 17, which is always open and in fluid communication with the pressurizing chamber 22, may fluidly extend from the conduit 15 but it is necessary that the drain 17 be fluidly located between the diaphragm 12 and the conduit line valve 16. Preferably the drain 17 is located integrally within the plug 18 so that when the collar 19 is unfastened, both the diaphragm 12 and the drain 17 are removable from the pump housing 11, together as an assembly. The diaphragm 12 is then removable from the plug 18 by removal of the O-ring 20. The plug 18 is formed of a rigid material such as plastic and the drain 17 is a bore formed by an aperture which is fixed in size. If the pressurized fluid utilized for powering the pump is a liquid, it has been found advantageous to size the drain 17 sufficiently small so that by capillary action the drain 17 will retain a prime of fluid within the conduit 15. In this respect, the previously described bore of 0.050 inch (1.3 mm) has been found to work very satisfactorily. While the drain 17 is definitely open, as is shown, the outlet of the drain 17 can be covered or enclosed by a flapper device which would not form a fluid restriction and also help to prevent evaporation of a liquid power fluid and also would prevent dirt, insects and foreign objects from entering the drain 17. Alternatively, for some applications, a piston device or other pressure transferring means could be substituted for the diaphragm 12 within the housing 11.

In operation of the pump 11, the power conduit 15 is connected to a source of pressurized power fluid 26 and the reservoir 24 has placed therein a supply of liquid to be pumped. The liquid in the reservoir 24 is not pressurized but flows by the force of gravity through the inlet 13 and inlet valve 23 and into the pumping chamber 21 of housing 11. The diaphragm 12 when in the preferred embodiment of a cylindrical cylinder has a free form shown in solid lines in FIG. 1. When the pumping chamber 21 fills with liquid, the diaphragm 12 completely collapses under the pressure from the incoming liquid and the collapsed shape of the diaphragm is shown in dotted line as indicated by 12c. The liquid outlet valve 25 has sufficient resistance to liquid flow therethrough so that the incoming fluid does not drain by the force of gravity out of the outlet 14.

The source control valve 28 is opened and fluid under pressure flows through source line 27 and then through the fluid restrictor 29. At least part of the source pressure is backed up by the restrictor 29 and part of the flowing fluid is directed into the conduit 15 and through the conduit valve 16 and into the pressurizing chamber 22. As the pressure backed up by the restriction 29 is applied against the diaphragm 12, simultaneously the diaphragm 12 beings to move and expand inside of the housing and apply the pressure to the liquid in the pumping chamber 21. The fluid also begins to flow out of the drain 17 but at a much lesser rate than the flow of fluid into the pressurizing chamber 22. As the diaphragm 12 expands and transfers pressure into the pumping chamber, the inlet valve 23 is closed and the outlet valve 25 opens and all liquid being pumped goes out of the outlet 14.

The pump 10 is a cyclical pump and its maximum capacity per cycle of pumping is the volume of the pumping chamber 21. During dispensing or pumping of liquid, the diaphragm 12 may be expanded beyond its normal free state and into an elastically stretched form shown in dotted line and indicated by 12e.

At the completion of a cycle of dispensing or pumping, the source control valve 28 is closed and pressure applied to the conduit 15 drops as fluid flow through the restrictor 29 ceases. The conduit valve 16 closes and precludes any reverse flow of power fluid backwards through the conduit 15. This prevents the pressure source 26 from dripping out of outlet 30. During the time that pressure was applied to conduit 15, a fractional portion of the fluid flowing through the conduit 15 was being discharged through the drain 17. Specifically, much less than one-half of the fluid flow in conduit 15 is discharged simultaneously with pumping and it has been found that about one-sixth of the fluid flow is discharged during pumping. Upon completion of the pumping cycle, the remaining fluid then in the pressurizing chamber 22 is prevented from backflowing in the conduit 15 to the source from whence it came and this fluid begins to be discharged out of the drain 17. When a large portion of the liquid in pumping chamber 21 has been discharged, there will be a corresponding large quantity of fluid in the pressurizing chamber 22. The diaphragm 12 will have been elastically expanded beyond the normal free form and the internal pressure of the diaphragm 12 elastically urging itself back to its normal form gives a pressure boost to help discharge out of the drain 17. After the diaphragm 12 returns to its normal free form, the pressure of incoming liquid then collapses the diaphragm 12 to force the balance of the fluid from the pressurizing chamber 22 out of the drain 17. When the pumping chamber 21 is refilled, flow from the drain 17 ceases.

It will be appreciated that with the foregoing structure, that the pressure source 26 will never drip or discharge after its control valve 28 is closed because there can be no backflow of the fluid used to power the pump 10 and that disposal of the fluid used for power of the pump 10 is disposed of elsewhere.

In FIG. 2, the pump 10a is shown with an alternate connection of conduit 15a to a pressure source. The fluid line 31 is pressurized and is the pressure source. The conduit 15a has at one end a normally closed valve 32 which is connected directly to the pressurized fluid line 31.

When the valve 32 is opened, pressure and fluid from line 31 are applied directly to the pump 10a. Again fluid is discharged out of the drain 17 and valve 32, when closed, precludes reverse flow of fluid in the conduit 15a and the fluid in the pump 10a is discharged out of the drain 17 as previously described.

One of the great advantages of the configuration of FIG. 2 is that a relatively costly three-way valve to discharge used power fluid is eliminated and the cyclical speed at which the pump 10a can operate is also greatly increased.

It will be appreciated from the foregoing that this pump 10 is of extremely simple construction and is virtually foolproof as it does not require complicated valving and the like. It is particularly well adapted for use in a home where the source line 31 is hooked to the house water supply. The diaphragm 12 is easily cleaned or replaced as it may be easily removed by removal of the plug 18 from the housing 11 and removal of the retaining O-ring 20.

Although various and minor modifications may be suggested by those versed in the art, it should be understood that I wish to embody within the scope of the patent warranted hereon, all such embodiments as reasonably and properly come within the scope of my contribution to the art.

I claim as my invention:

1. A liquid dispensing pump powerable by a pressurized liquid, comprising:
   (a) a pump housing having therein a pumping and pressurizing chamber, said chambers being physically divided from each other;
   (b) means movable within the housing for transferring a pressure in the pressurizing chamber to the pumping chamber and for reducing the volume of the pumping chamber;
   (c) a liquid inlet to the pumping chamber, said inlet having a valve for directing liquid flow into the pumping chamber;
   (d) a liquid outlet from the pumping chamber, said outlet having a valve for directing liquid flow from the pumping chamber;
   (e) a liquid source line having an upstream end adapted to be connected to a source of liquid under pressure, a normally closed control valve which upon being opened and operable for permitting a flow of liquid under pressure through said source line, a flow restrictor downstream of said control valve for backing up at least part of the source pressure during flow of liquid therethrough, and an outlet for discharge of liquid flowing through said restrictor;
   (f) a pressurizable power conduit having an inlet end fluidly connected to said source line in between the control valve and the restrictor, a second end fluidly connected to the pressurizing chamber, and a check valve for permitting a flow of liquid under pressure from said source line through the conduit to the pressurizing chamber and for precluding reverse flow of liquid from the pressurizing chamber back to the source line from whence the liquid came; and
   (g) an open drain fluidly connecting the pressurizing chamber to atmosphere, said drain being sized with respect to said power conduit to form a greater restriction to flow of power liquid therethrough than does said power conduit, for permitting flow of power liquid through the drain during an operative pressurization of the pressurizing chamber of only a fractional portion of the power liquid passing through said power conduit during such pressurization, and for draining from said pressurizing chamber the remainder of the power liquid passed through said power conduit during such operative pressurization, upon termination of an operative pressurization of said power conduit, said drain being a capillary aperture sized for retaining by capillary action a prime of liquid within the power conduit and pressurizing chamber.

* * * * *